A. R. PRITCHARD.
LANTERN.
APPLICATION FILED MAY 8, 1911.

1,032,772.

Patented July 16, 1912.

Witnesses:
C. W. Carroll
L. Thon

Inventor:
Albert R. Pritchard
by his attorneys
Osgood, Davis & Worsey

UNITED STATES PATENT OFFICE.

ALBERT R. PRITCHARD, OF ROCHESTER, NEW YORK.

LANTERN.

1,032,772.  Specification of Letters Patent.  Patented July 16, 1912.

Application filed May 8, 1911. Serial No. 625,822.

*To all whom it may concern:*

Be it known that I, ALBERT R. PRITCHARD, a citizen of the United States, and resident of Rochester, in the county of Monroe and State of New York, have invented certain new and useful Improvements in Lanterns, of which the following is a specification.

This invention relates to lanterns of the type in which the oil-font and the globe are mounted in a wire frame constituting a guard for the globe and a base or support for the oil-font.

The object of the invention is to provide a simple arrangement and construction of parts by which the bail may be retained in depressed position when desired, and to this end I arrange the bail to spring over and within the base-ring of the frame in the manner hereinafter described.

Figure 1:
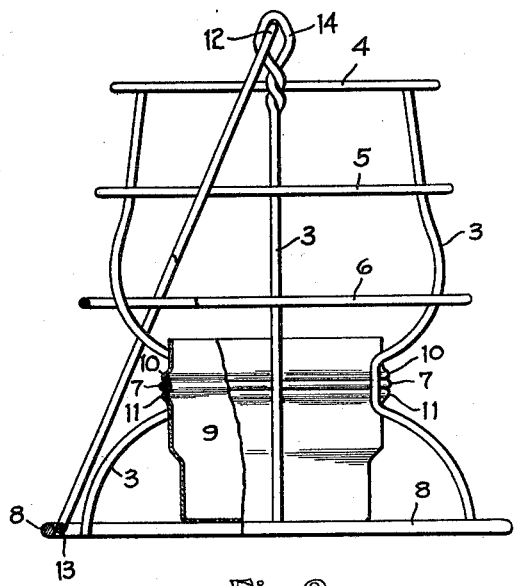
Figure 2:
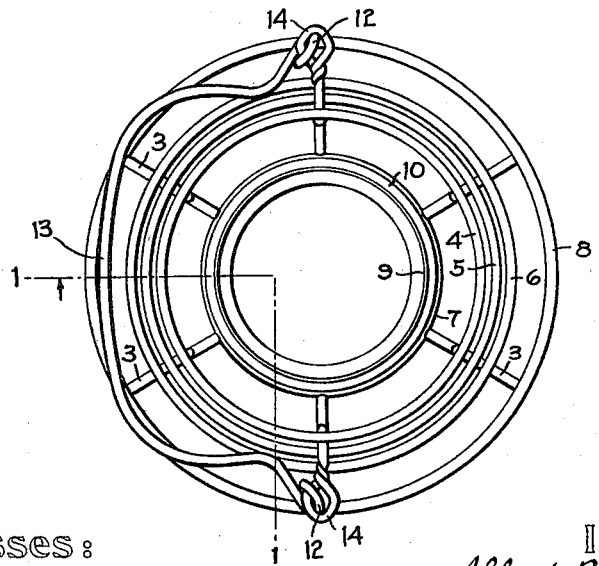

In the accompanying drawings:—Figure 1 is a side-elevation of a lantern-frame embodying the present invention, with a portion shown in section on the line 1—1 in Fig. 2; and Fig. 2 is a plan-view of the frame shown in Fig. 1.

The invention is illustrated as embodied in a lantern-frame of a general form which is familiar in lanterns of the type known as railroad-lanterns or signal-lanterns, and the dome, the globe, and the oil-font of the lantern are not illustrated as they may be of any ordinary or suitable form.

The illustrated frame comprises the usual uprights 3 and horizontal rings 4, 5, 6 and 7 connected with the uprights, and a base-ring 8 constituting a support for the frame. To receive the oil-font the frame is provided with the usual oil-font receptacle 9, which may be in the form of an integral, drawn sheet-metal member. The oil-font receptacle is closely embraced by the frame-ring 7, and immediately above and below the ring are beads 10 and 11 respectively, which project outwardly from the receptacle, thus forming an annular groove in which the ring 7 is seated.

The invention resides in the construction of the handle or bail 13 and its relation to the base-ring 8. Two of the uprights 3 are provided, at their upper ends, with loops 14 constituting bearings for the bail, and the bail is provided with eyes 12 engaging these loops. The bail is formed of resilient wire in the usual manner, and the loops 14 are outwardly-inclined so that the tendency of the bail-ends to spring outwardly acts in a well-known manner to raise the bail automatically to upright position, ready for convenient use, when the bail is released in any position. This arrangement is not novel, and does not constitute a part of the present invention. It is frequently convenient, however, to have the bail remain in depressed position, and for this purpose I employ a bail of a length slightly greater than the distance between the loops 14 and the base-ring. Owing to this arrangement the middle portion 13 of the bail may be sprung over and within the base-ring between two of the uprights 3, as shown in the drawings. The bail when in this position is retained securely and so remains until it is sprung back over the base-ring. This arrangement is convenient where the lantern must be carried under the arm, as is commonly done by railroad conductors and brakemen, and it also facilitates packing the lantern, as it prevents the handle from rising in consequence of the automatic arrangement for raising it.

I am aware that it has previously been proposed to lock a lantern-bail in depressed position by swinging it beneath the base of the lantern, where it engages retaining-notches, but in such previous construction the bail, when in depressed position, prevents the lantern from standing on its base, while in the present construction this disadvantage is avoided, as the bail never projects below the base.

I claim:—

In combination with a lantern-frame comprising uprights and a base-ring connected together, a resilient wire bail pivoted to the upper portion of the frame, the normal length of the bail being slightly greater than the distance between its pivots and the base-ring, so that the middle of the bail may be sprung over and within the base-ring at one side of the frame and between the points of attachment of the uprights to the base-ring, whereby the bail is retained resiliently in depressed position.

ALBERT R. PRITCHARD.

Witnesses:
C. S. DAVIS,
L. THON.

Copies of this patent may be obtained for five cents each, by addressing the "Commissioner of Patents, Washington, D. C."